Sept. 29, 1931.                G. H. MAINS                1,824,825
                       MOLDED LAMINATED GEAR BLANK
                           Filed Nov. 6, 1928
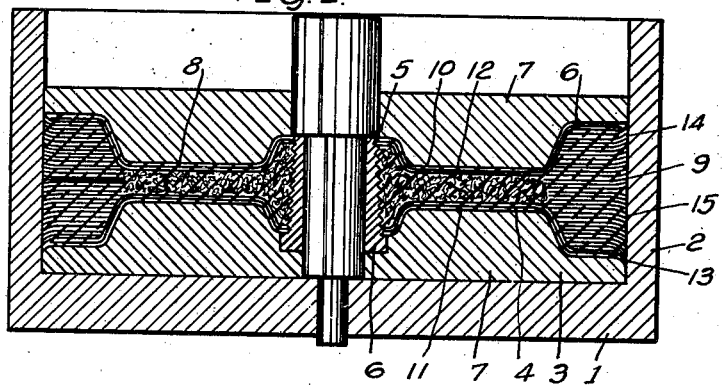
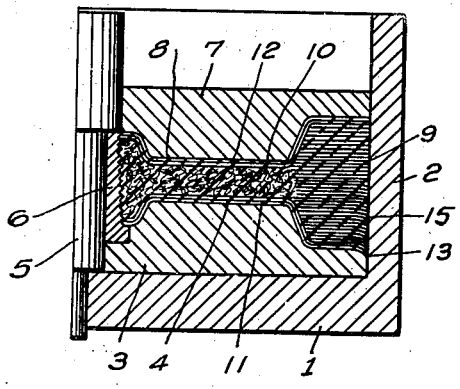
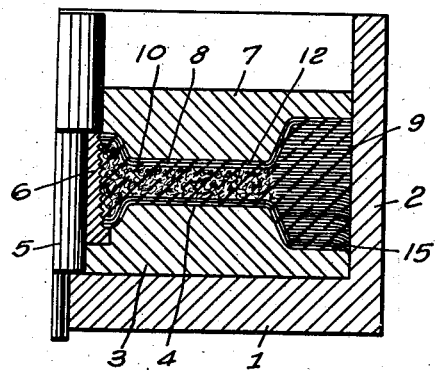
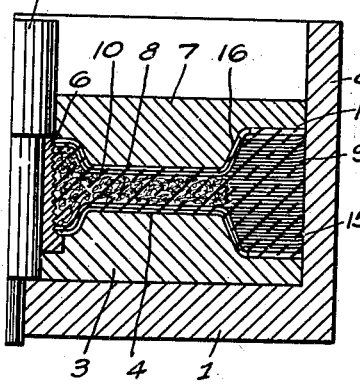
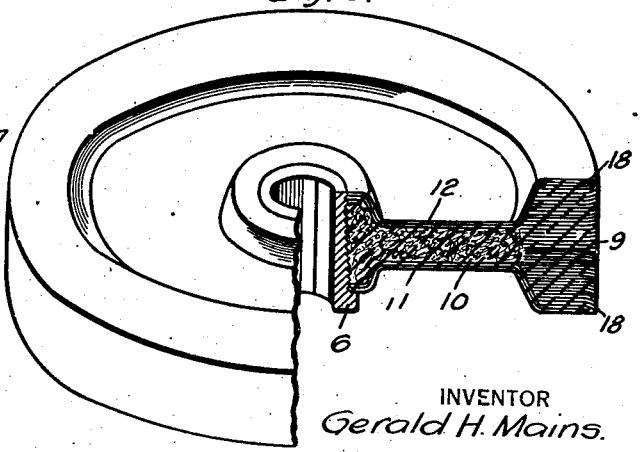
INVENTOR
Gerald H. Mains.
BY
ATTORNEY Patented Sept. 29, 1931

1,824,825

UNITED STATES PATENT OFFICE

GERALD H. MAINS, OF WILKINSBURG, PENNSYLVANIA, ASSIGNOR TO WESTINGHOUSE ELECTRIC & MANUFACTURING COMPANY, A CORPORATION OF PENNSYLVANIA

MOLDED LAMINATED GEAR BLANK

Application filed November 6, 1928. Serial No. 317,652.

My invention relates to gear blanks having rims formed of composite laminated material and more particularly to gear blanks of this type in which the laminations of the rims are flared so that the tooth cutting operation may be economically performed in a satisfactory manner.

An object of my invention is to provide a gear blank having a rim composed of laminations which are flared outwardly at the edge of the rim to prevent chipping of the material or separation of the laminations during the tooth cutting operation.

Another object of my invention is to provide a gear blank having a rim composed of laminated material in which the laminations, and particularly those adjacent to at least one face of the gear, are flared outwardly with respect to the central plane of the gear so that the angle formed between a hob or other tool utilized in cutting the teeth and the laminations will be substantially less than 90 degrees.

Another object of my invention is to provide an improved method of producing a composite gear having a rim composed of laminated fabric material which comprises so molding the material that the laminations, and especially those adjacent to at least one face of the gear, will be flared outwardly, thus enabling the tooth cutting operation to be performed without chipping the material or causing the laminations to separate.

A composite gear blank as manufactured at the present time, comprises an outer rim consisting of laminated sheets of fibrous material and a web composed either of laminated material or of fabricated cloth which has been chopped, shredded or cut into small pieces. The gear blank also may be provided with a metallic hub and facing sheets, such as rings fitting over both sides of the rim or shrouds covering both sides of the rim and web. The fibrous material, impregnated with a suitable binding material, such as a phenolic condensation product, is consolidated under heat and pressure around the metallic hub to form a gear blank which is subsequently machined to the required size.

Difficulty, however, has been experienced in cutting teeth in a gear formed in this manner because there has been a tendency for the laminated layers of the rim to separate and chip at the face of the gear from which the cutting tool emerges and this is particularly true when the cutting is performed during rapid feeding of a hob or other tool that has become slightly dull. In order to overcome this difficulty, it has been the practice during the cutting operation to support the face of the laminated gear blank from which the tool emerges to prevent the separation of the laminations and the chipping of the material. This method however is both expensive and time consuming.

I have made the discovery that, if the rim of the gear blank is so molded that the laminations forming the rim of the gear are flared outwardly near the outer periphery of the rim of the blank, and especially those laminations that are adjacent to the face of the gear blank from which the cutting tool emerges, the tooth cutting operation may be performed without causing the laminations to separate, and the expensive and time consuming process of supporting the rim will be eliminated.

My invention will be better understood by reference to the accompanying drawings in which:

Figure 1 is a cross sectional view of my preferred gear blank and the mold utilized in forming the same;

Fig. 2 is a fragmentary sectional view showing a modified gear blank and a mold similar to that shown in Fig. 1;

Fig. 3 is a view, similar to Fig. 2, showing another modified gear blank and illustrating how it may be produced in a mold of usual form;

Fig. 4 is a view, similar to Figs. 2 and 3, showing a mold and a modified gear blank and illustrating a method of producing outwardly flared laminations; and Fig. 5 is a perspective view of the gear blank shown in Fig. 1.

Referring to Fig. 1 of the drawings, the mold comprises a bottom 1 having a cylindrical wall 2 extending upwardly therefrom. A stationary block 3, having a flat bottom and an upper surface 4 conforming to the lower face of the gear blank, is placed inside the wall 2 to constitute the bottom of the mold. A stud or bolt 5, inserted in the bottom of the mold and extending through the central portion of the stationary block, serves as a support for a metal hub 6. The fibrous material is then inserted in the mold and pressure is applied by the action of a platen or ram acting upon a movable block 7 which has a flat upper surface and a lower surface 8 conforming to the upper face of the gear blank.

In forming the rim of the gear blank, a comparatively wide strip of fibrous material, impregnated with a suitable binder, such as a phenolic condensation product, and having a plurality of diamond shaped notches cut centrally therein, is folded upon itself in a manner similar to that described in the patent to Bierman, et al., Ser. No. 1,599,550, issued on September 14, 1926.

The folded strip is then helically wound around a suitable form or mandrel, and the ring shaped laminations thus formed are placed on the interior of a mold having an upwardly extending central portion. Fibrous material, such as cotton flock, or duck that has been suitably shredded, chopped, or cut into small pieces, and which has been impregnated with a suitable binder or mixed with a resin, is placed in the mold between the laminated material and the upwardly extending central portion and pressure is applied which compacts the shredded or chopped material and forces it against the external rim portion, forming a unitary structure consisting of the rim and the web.

In forming the finished gear blank, the hub 6 is placed on the central stud 5 which extends upwardly from the bottom of the mold. The lower shrouds or discs 11, the previously formed unitary structure consisting of the rim and web, and upper shrouds or discs 12, all impregnated with a suitable binder, such as a phenolic condensation product, are disposed around the central hub.

The mold may be any of the forms usually employed, such as single or multiple cavity or it may be of the flash or positive type. The portion of the face of the block 3 that comes in contact with the rim during the molding operation, however, has a beveled or rounded edge constituting a depression, as indicated at 13, and both the upper and lower shrouds are undersized, that is, they do not extend to the edge of the rim.

The assembled parts of the gear are then subjected to heat and pressure, the heat causing the binder to flow and the pressure compacting the softened material. Upon subsequent and continued application of heat and pressure, the entire mass solidifies to form a composite integral structure, as illustrated in Fig. 5. The upper laminations of the rim will be slightly flared upwardly, as indicated at 14, because the upper shrouds do not extend to the outer edge of the rim, and the lower laminations will be flared downwardly for the same reason and also because of the depression formed by the beveled or rounded edge of the block 3.

It will be noted that, when the gear blank is made by the method specified, a ridge or fin is formed at the edge of each face, as indicated at 18, and the face width at the extreme edge of the rim is greater than at the remaining portions. When undersized shrouds are utilized in combination with a block having a beveled or rounded edge, the same flaring effect may be produced with a smaller depression than is obtained when a deeper depression is formed in the block and the shroud sheets are of the usual size. In the latter case, however, the ridge or fin that is formed during the molding operation is larger, and, as it is generally necessary to remove this ridge, either by a grinding operation or when the gear blank is subsequently machined to produce a gear having an accurate face width, it is desirable, for economic reasons, that the ridge should be as small as possible. A small edge depression in the block, however, is desirable because it prevents the facing sheet from slipping and this is especially true when rings are employed as the facing material for the rim of the gear.

The gear blanks shown in Figs. 2 and 3 are molded by essentially the same process as the blank illustrated in Fig. 1, with the exception that, in Fig. 2, the shrouds are of the usual size and the outward flared laminations adjacent to the lower face of the gear blank are produced by means of a depression ground in the extreme edge of the block 3 while, in Fig. 3, a similar result is accomplished by utilizing undersized shrouds.

In the method disclosed in Fig. 2, the degree that the laminations are flared may be regulated by the size of the depression. This method is especially desirable when the gear blank is not provided with shrouds or rings. The method disclosed in Fig. 3 is sometimes advantageous because, when employing this method, it is not necessary to modify the mold, and no projecting ridge is formed on the face of the rim.

Experiments demonstrate that the separation of the laminations and the chipping of the material by the cutting tool occur at or closely adjacent to that face from which the tool emerges and, while the methods illustrated in Figs. 2 and 3 do not constitute the preferred embodiment of my invention, they are satisfactory when the tool emerges from the bottom; that is, when the gear teeth are cut in one direction only.

A gear blank having a rim with upwardly flared laminations that are formed by a modified process is illustrated in Fig. 4. When this method is employed, a slightly wider strip of laminated material may be wound around the mandrel to form the rim of the gear blank, or, if preferred, strips of standard width may be wound around a form having a larger diameter. When the preformed structure consisting of the rim 9 and web 10 are inserted in the mold, as previously described, the outer laminations of the rim will engage the wall of the mold and, since the diameter of the rim is greater than that of the mold, the outer edges of the laminations will be tilted or flared upwardly during the molding operation and those laminations which are adjacent to the upper surface will be flared to a greater degree than lower laminations. When gears are formed in this manner, it is preferred that the cutting operation be initiated at the bottom so that the tool will emerge from the top.

A combination of the methods utilized in forming the gear blanks illustrated in Figs. 2 and 4, or of the methods utilized in forming the gear blanks illustrated in Figs. 3 and 4, may be employed to good advantage in forming a gear blank in which the teeth may be cut in either direction. The laminated layers adjacent to the upper face of the gear blank will be flared upwardly because of frictional engagement of the laminations with the side of the mold, and the layers adjacent the lower side of the gear blanks will be flared downwardly because of the depression in the block or because undersized shrouds are employed.

When the cutting operation is to be performed in one direction only, the frictional-engagement method disclosed in Fig. 4 may be combined with the use of an undersized shroud on the upper face of the blank or with a mold having a depression ground in the edge of the upper movable block 7. Either method will increase the flare and may be utilized to good advantage.

In some types of gear blanks, one or more of the shrouds do not extend completely over the web and rim but terminate along the sides of the rim, as indicated at 16 in Fig. 4. In such cases, separate rings 17 having a smaller width than the rim are provided as a facing material for the rim to produce the effect illustrated in Figs. 1 and 3. When a ring serves as a facing material, it may be placed on the surface of the rim during the performing operation or fastened to the rim material or, if a full sized shroud is employed, and a disc and a ring are placed over the shroud, the ring may be fastened to the underlying shroud to prevent slipping during the molding operation.

A full sized facing sheet or shroud sometimes has a tendency to pull away from the exterior edge of the rim during the molding operation and this is especially true when the gear has a thin web, as illustrated in the drawings. When a ring is employed as the facing material, it is, therefore, necessary to leave more space between the outer edge of the ring and the edge of the rim, as the best results are obtained when the distance between the edges of the shrouds or rings and the outer edge of the rim in the finished gear is approximately one-eighth of an inch.

While I have described my invention in considerable detail and have illustrated various methods of forming the gear blank, it will be understood that I do not desire to limit myself to the exact details disclosed. For example, my invention may be utilized in gears in which both the rim and the web are formed of laminated material or in gears having a rim formed of rings or segments instead of helically wound material. The rim is preferably formed of laminated fabric but I do not preclude the use of such fibrous material as paper, asbestos or felt. In some cases the fibrous material may also be reinforced by perforated metal, or wire strands may be interwoven therein. The web portion may also be formed of metal or, if desired, it may be formed of fibrous material having the same thickness as the rim. Any well known binding agent may also be substituted for the phenolic condensation product, such as glue or glycerol-phthalate resins.

Other modifications of my invention will become apparent to those skilled in the art. I desire, therefore, that only such limitations shall be imposed thereon as are required by prior art and the appended claims.

I claim as my invention:
1. A gear blank having a rim portion comprising layers of fibrous material impregnated with a phenolic condensation product, the layers adjacent at least one face being flared outwardly.

2. A gear blank having laminations which are flared outwardly at the edge of the blank to prevent the laminations from chipping or separating during the teeth-cutting operations.

3. A gear blank comprising layers of material having outwardly flared edge portions, said laminations being flared outwardly to prevent chipping or separating of the material during the teeth-cutting operation.

4. A gear blank comprising layers of fibrous material having their edge portions flared outwardly at an angle to the central plane of the gear to prevent chipping or separating of the material during the teeth-cutting operation.

5. A gear blank comprising layers of fibrous material flared outwardly adjacent to at least one face of the blank so that the angle formed between the line of travel of a tool utilized in cutting teeth in the blank and the layers will be less than 90 degrees.

6. A gear blank comprising a rim portion formed of layers of fibrous material, the layers adjacent to at least one face of the rim being flared outwardly so that a tool utilized in cutting teeth on the rim will not chip the material or cause the layers to separate.

7. A gear blank having a rim portion comprising laminated material having outwardly flared laminations to prevent chipping or separating of the material during the teeth-cutting operation, the width of said rim being greater at its outer edge than at any of its other portions.

8. A gear blank comprising a molded rim composed of composite layers of material impregnated with a binder, part of said layers being flared outwardly during the molding operation so that the extreme edge of the molded rim has a greater width than the remaining portions.

9. A gear blank having a rim comprising laminated fabric material, a facing sheet on said rim which does not extend to the edge of the rim, a portion of said laminations being flared at an angle to said facing sheet.

10. A gear blank comprising a rim formed of laminated material, a web formed of shredded or chopped fabric and a binding agent, a sheet of facing material extending over each side of said web and the major portion of said rim, said laminated material adjacent to each face being flared outwardly at an angle to the central plane of the gear blank.

11. The method of producing a gear blank having a rim provided with outwardly flared laminations adjacent to at least one face which comprises impregnating the fibrous laminated material of the rim with a binding agent and forming the gear blank in a mold of such size or contour that the laminations adjacent to at least one face of the rim will be flared outwardly.

12. The method of producing a gear blank having a rim provided with outwardly flared laminations adjacent to at least one face which comprises impregnating layers of fibrous material with a binding agent and forming the gear blanks under heat and pressure in a mold having a bevelled depression at the outer edge of one of its pressure blocks.

13. The method of producing a gear blank having a rim provided with outwardly flared laminations adjacent to at least one face which comprises impregnating layers of fibrous material with a binding agent, placing a facing sheet over only the inner portion of the impregnated layers and molding the gear blank under heat and pressure.

14. The method of producing a gear blank having a rim provided with outwardly flared laminations adjacent to at least one face which comprises impregnating layers of fibrous material with a binding agent, placing a facing sheet over only the inner portion of the impregnated layers and forming the gear blank in a mold having a depression at the outer edge of one of its pressure blocks.

15. The method of producing a gear blank having a rim provided with outwardly flared laminations adjacent to both faces which comprises impregnating layers of fibrous material with a binding agent, placing a facing sheet over the inner portion of each side of the impregnating layers and forming the gear blank in a mold having a depression at the outer edge of one of its pressure blocks.

In testimony whereof, I have hereunto subscribed my name this 31st day of October, 1928.

GERALD H. MAINS.